United States Patent
Tamura et al.

[11] 3,910,924
[45] Oct. 7, 1975

[54] 3,4-DIHYDROCARBOSTYRIL DERIVATIVES AND A PROCESS FOR PREPARING THE SAME

[75] Inventors: Yasumitsu Tamura, Takarazuka; Kazuyuki Nakagawa, Tokushima; Shiro Yoshizaki, Komatsujima; Nanami Murakami, Tokushima, all of Japan

[73] Assignee: Otsuka Pharmaceutical, Co., Ltd., Tokyo, Japan

[22] Filed: Jan. 19, 1973

[21] Appl. No.: 324,905

[30] Foreign Application Priority Data
Apr. 13, 1972 Japan............ 47-37181
Apr. 13, 1972 Japan............ 47-37182

[52] U.S. Cl...... 260/288 R; 260/289 K; 260/286 R; 424/258
[51] Int. Cl.² ................ C07D 215/22
[58] Field of Search .......... 260/289 R, 288 R

[56] References Cited
UNITED STATES PATENTS
3,340,266  9/1967  Howe et al............ 260/288 R
FOREIGN PATENTS OR APPLICATIONS
1,058,822  2/1967  United Kingdom......... 260/288 R
42-118267  1967  Japan.................. 260/288 R
46-3878971 1971  Japan.................. 260/289 K

*Primary Examiner*—Donald G. Daus
*Assistant Examiner*—Mary C. Vaughn
*Attorney, Agent, or Firm*—Sughrue, Rothwell, Mion, Zinn & Macpeak

[57] ABSTRACT

A novel compound represented by the formula

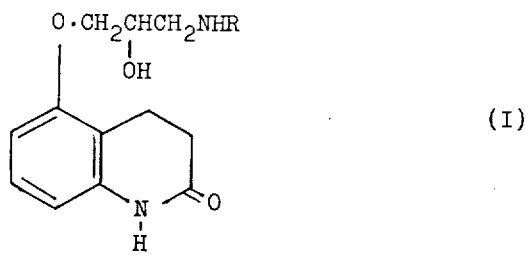

(I)

wherein R is defined as hereinafter, having a blocking activity on β-adrenergic nerves, a novel intermediate useful for synthesis thereof and processes for preparing the same are disclosed.

6 Claims, No Drawings

3,4-DIHYDROCARBOSTYRIL DERIVATIVES AND A PROCESS FOR PREPARING THE SAME

BACKGROUND OF THE INVENTION

1. Field of the Invention

The present invention relates to novel 3,4-dihydrocarbostyril derivatives, novel intermediates useful for the preparation thereof and processes for preparing both the 3,4-dihydrocarbostyril derivatives and the intermediate.

2. Description of the Prior Art

It is known that certain carbostyril derivatives exhibit useful pharmacological activities. Representative compounds of this type are those disclosed in Japanese Patent Publication Nos. 1182/1967 and 38789/1971, and Chemical Abstracts, 62, 1b 212e (1965), etc. However, the above references do not teach that compounds having a 2-hydroxy-3-substituted-aminopropoxy group at 5-, 6-, 7- or 8-position of the carbostyril moiety exhibit an excellent blocking activity on β-adrenergic nerves.

SUMMARY OF THE INVENTION 5-(2-Hydroxy-3-alkylamino)propoxy-3,4-dihydrocarbostyrils of the formula (I) which exhibit a blocking activity on β-adrenergic nerves and which are therefore useful as pharmaceuticals for treating arrhythmia in auricular fibrillation and disorders in coronary sclerosis are prepared by reacting the novel intermediate compound 5-(2,3-epoxy)propoxy-3,4-dihydrocarbostyril with an alkylamine of the formula

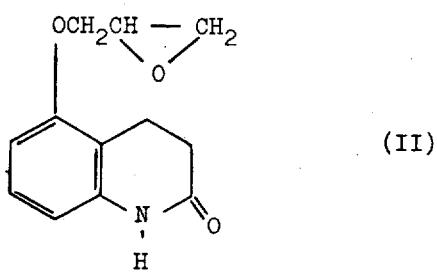

R in both formulae I and II represents a straight or branched chain alkyl group having 1 to 4 carbon atoms.

The intermediate 5-(2,3-epoxy)propoxy-3,4-dihydrocarbostyril is prepared by reacting 5-hydroxy-3,4-dihydrocarbostyril with an epihalogenohydrin.

The acid addition salts of the 5-(2-hydroxy-3-alkylamino)propoxy-3,4-dihydrocarbostyril exhibit the same activity as the free base compound.

DETAILED DESCRIPTION OF THE INVENTION

This invention relates to novel 3,4-dihydrocarbostyril derivatives represented by the formula

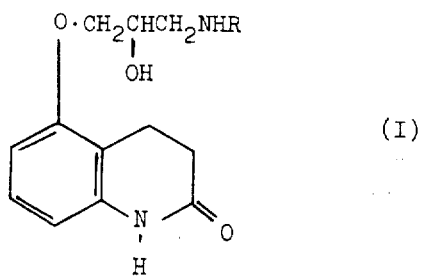

wherein R represents a straight or branched alkyl group having 1 to 4 carbon atoms, a novel intermediate useful for the preparation thereof and processes for preparing the 3,4-dihydrocarbostyril derivatives and the intermediate.

The novel intermediate according to the present invention is 5-(2,3-epoxy)propoxy-3,4-dihydrocarbostyril represented by the formula:

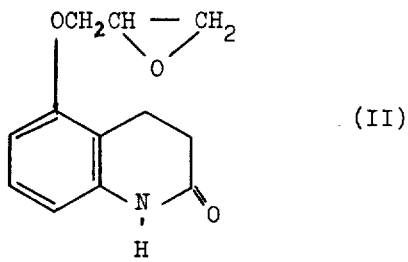

Propoxy-3,4-dihydrocarbostyrils are novel compounds not previously reported in the literature and exhibit a useful pharmacological activity.

5-(2-Hydroxy-3-alkylamino)propoxy-3,4-dihydrocarbostyrils according to the present invention are basic substances and can form acid addition salts with acids, for example, inorganic acids such as hydrochloric, sulfuric and phosphoric acids and organic acids such as oxalic, maleic, fumaric, malic, tartaric, citric and ascorbic acids and the like. The acid addition salt form shows increased solubility in water as compared to the free base form and increased stability to heat and light. Any pharmaceutically acceptable inorganic or organic acid can be used.

Both the above free bases and acid addition salts exhibit a blocking activity of β-adrenergic nerves and therefore are useful as pharmaceuticals for treating arrhythmia in auricular fibrillation and disorders in coronary sclerosis such as arrhythmias, tachycardia, angina pectoris, coronary insufficiency, hypertension, etc.

3,4-Dihydrocarbostyril derivatives of this invention can be easily prepared by reacting the novel intermediate having the above formula (II) with an alkylamine represented by the formula

wherein R is defined as above. The reaction between 5-(2,3-epoxy)propoxy-3,4-dihydrocarbostyril (II) and alkylamine (III) is carried out at a temperature in the range of from about 0°C to about 80°C, in the presence or absence of an inert organic solvent such as a lower alkanol, for example, methanol, ethanol and propanol, and ethyl acetate, or an inert hydrocarbon, preferably of low polarity.

More particularly, 3,4-dihydrocarbostyril derivatives of the formula (I) can be prepared by reacting 5-(2,3-epoxy)propoxy-3,4-dihydrocarbostyril (II) and a molar excess of an alkylamine of the formula (III), e.g., 20 to 40 moles, preferably 2 to 4 moles of the alkylamine, in the presence or absence of the above described solvent at a temperature of from about 0° to 80°C, preferably from 45° to 55°C, for a period of from about 2 to about 8, preferably from 3 to 5 hours. Although one can use great excesses of the alkylamine, e.g., 100–200 moles of the alkylamine per mole of the compound of formula (II), such is not necessary and will seldom be used. Although pressure is not critical, the reaction is usually carried out under atmospheric pressure, though elevated pressures can be used, if desired, though seldom would any need exist to run at pressures above 10 atmospheres. Preferred solvents are lower alkanols, for example methanol, ethanol and the like. After completion of the reaction, the solvent and the unreacted amine (III) are distilled from the reaction mixture to obtain the desired product. The product may be recovered in the form of acid addition salts thereof. The acid addition salt can easily be produced by dissolving the above obtained product in an appropriate solvent, for example, acetone, ethanol, isopropanol and chloroform and adding a solution of an organic or inorganic acid in the same solvent thereto, whereby the crystalline acid addition salt is formed easily. The resulting acid addition salt can be recrystallized, if desired, from lower alkanols, for example ethanol and isopropanol to obtain a purified acid addition salt.

Alternatively, the thus obtained acid addition salt can be converted into the corresponding free base by treating the salt with an alkali, for example, sodium or potassium hydroxide in the procedure well known to one skilled in the art.

The novel intermediate, 5-(2,3-epoxy)propoxy-3,4-dihydrocarbostyril represented by the formula (III), can be prepared by reacting 5-hydroxy-3,4-dihydrocarbostyril with an epihalogenohydrin, for example, epichlorohydrin or epibromohydrin, in the presence of an appropriate acid acceptor. This reaction can be carried out at atmospheric pressure (elevated pressures can also be used) in the presence of an acid acceptor with or without using a solvent, for example, lower alkanols, water, lower alkyl acetates and ketones. Suitable examples of lower alkanols are methanol, ethanol, isopropanol, n-propanol, n-butanol and the like. Suitable examples of lower alkyl acetates are ethyl acetate, methyl acetate, propyl acetate and the like. Suitable examples of ketones are acetone and methylethylketone. It is preferred to select the solvent depending upon the type of the acid acceptor used. For example, in preferred embodiments, lower alkanols are used with alkali metals and water is used with alkali hydroxides. When the acid acceptors used are organic bases as set forth below, the reaction can be carried out without using solvents or using lower alkanols, lower alkyl acetate and ketones.

The reaction temperature can widely vary ranging from about 0° to about 120°C and is preferably from 50° to 100°C. The acid acceptors found to be useful in the reaction include any basic compounds, such as alkali metals, alkali hydroxides, alkali carbonates, organic bases and the like, but sodium metal, potassium metal, sodium hydroxide, potassium hydroxide, sodium carbonate, potassium carbonate, sodium alcoholate, potassium alcoholate or piperidine, piperazine, pyridine, lower alkylamine, e.g., diethylamine, triethylamine, methylamine, etc. are preferably used. The reaction can be carried out by using the epihalogenohydrin in an amount of from 1 to 5, preferably 3 to 4 moles per 1 mole of 5-hydroxy-3,4-dihydrocarbostyril and the reaction time from about 2 to about 8, preferably from 4 to 5 hours.

The invention will be further illustrated by way of several examples, but they are not to be construed as limiting the present invention and various changes and modifications can be made therein without departing from the spirit and scope of the present invention.

Reaction in all Examples was at atmospheric pressure.

EXAMPLE 1

1.53 g of 5-hydroxy-3,4-dihydrocarbostyril and 3.5 g of epichlorohydrin were added to 30 ml of a methanolic solution of 0.216 g of sodium metal and the resulting solution was stirred at a temperature of from 55° to 60°C for 4 hours. After allowing the solution to cool, the precipitated sodium chloride was filtered and the filtrate was concentrated to dryness under reduced pressure. The thus obtained residue was then extracted while warm with ethyl acetate, which was then distilled off. The residual substance was recrystallized from acetone-ethyl ether to obtain 1.0 g of 5-(2,3-epoxy)propoxy-3,4-dihydrocarbostyril as a colorless amorphous solid having a melting point of 172° to 173°C. The infrared absorption spectrum of the product showed characteristic absorptions at 3020 cm$^{-1}$, 1665 cm$^{-1}$ and 1590 cm$^{-1}$.

Analysis; Calc. for $C_{12}H_{13}NO_3$: C, 65.74; H, 5.98; N, 6.39. Found: C, 65.55; H, 5.84; N, 6.47.

EXAMPLE 2

A mixture of 1.63 g of 5-hydroxy-3,4-dihydrocarbostyril, 2.5 g of epibromohydrin and 2 drops of piperidine was heated at a temperature of 95°–100°C for a period of 4 hours with stirring. The reaction mixture was then concentrated to dryness under reduced pressure and the residue was recrystallized from acetone to obtain 1.2 g of 5-(2,3-epoxy)propoxy-3,4-dihydrocarbostyril as a colorless powder having a melting point of 172° to 173°C.

EXAMPLE 3

To a solution of 0.6 g of sodium hydroxide dissolved in 40 ml of water were added 2.45 g of 5-hydroxy-3,4-dihydrocarbostyril and 3.5 g of epichlorohydrin, and the resulting solution was stirred at a temperature of from 30° to 40°C for 4 hours. After allowing to cool, the precipitated crystals were separated by filtration and recrystallized from acetone to obtain 1.75 g of 5-(2,3-epoxy)propoxy-3,4-dihydrocarbostyril as a colorless amorphous solid having a melting point of 172° to 173°C.

EXAMPLE 4

1.5 g of isopropylamine and 30 ml of methanol were added to 1.5 g of 5-(2,3-epoxy)propoxy-3,4-dihydrocarbostryil and the resulting mixture was stirred at a temperature of from 45° to 50°C for 4 hours followed by distillation of methanol and unreacted isopropylamine. The residue was dissolved in acetone and the solution was combined with an acetone solution of maleic acid. The precipitated crystals were filtered and recrystallized from isopropanol to give 2.1 g of 5-(2-hydroxy-3-isopropylamine)propoxy-3,4-dihydrocarbostyril maleate as colorless amorphous crystals having a melting point of 218°–220°C (recrystallized from ethanol).

Analysis: Calc. for $C_{19}H_{26}N_2O_9$: C, 57.86; H, 6.64; N, 7.10. Found: C, 57.84; H, 6.37; N, 7.25.

The thus obtained 5-(2-hydroxy-3-isopropylamino)propoxy-3,4-dihydrocarbostryil maleate was then treated with sodium or potassium hydroxide to obtain colorless amorphous crystals of 5-(2-hydroxy-3-isopropylamino)propoxy-3,4-dihydrocarbostyril having a melting point of 145° to 145.5°C.

Analysis: Calc'd. for $C_{15}H_{22}N_2O_3$: C, 64.72; H, 7.97; N, 10.06. Found: C, 65.00; H, 7.75; N, 10.21.

EXAMPLE 5

The same procedure as described in Example 4 was repeated substituting hydrochloric acid for maleic acid to give colorless amorphous crystals of 5-(2-hydroxy-3-isopropylamino)propoxy-3,4-dihydrocarbostyril hydrochloride having a melting point of 224° to 225°C.

Analysis: Calc'd. for $C_{15}H_{23}ClN_2O_3$: C, 57.23; H, 7.36; N, 8.90. Found: C, 57.38; H, 7.10; N, 9.06.

EXAMPLE 6

A mixture of 0.75 g of 5-(2,3-epoxy)propoxy-3,4-dihydrocarbostyril, 1.0 g of tert-butylamine and 25 ml of ethanol was stirred at a temperature of from 50° to 55°C for a period of 4 hours. Ethanol and unreacted tert-butylamine were distilled off under reduced pressure and the resulting residue was dissolved in acetone. The resulting acetone solution was combined with 0.5 g of maleic acid to precipitate crystals which were then separated by filtration. Recrystallization of the crystals from ethanol gave 1.05 g of 5-(2-hydroxy-3-tert-butylamino)propoxy-3,4-dihydrocarbostyril maleate as colorless amorphous crystals having a melting point of 206° to 207°C.

Analysis: Calc'd. for $C_{20}H_{28}N_2O_7$: C, 58.81; H, 6.91; N, 6.86. Found: C, 58.72; H, 7.05; N, 7.14.

EXAMPLE 7

The antagonistic activity of the compounds of this invention against isopenaline was determined using the β-blockers screening method (C. E. Powell, I. H. Slater : J. Pharmac, 122, 480 (1958).

Male hybrid adult dogs, weighing 13 to 20 Kg were anesthesized with 30 mg/Kg of body weight of pentobarbital sodium administered intravenously. Each of the test compound were then administered to the anesthesized dog at a dosage level of $10^{-7}$ mol/Kg of body weight from the femoral vein and after 5 minutes isoprenaline was administered to the dog through the femoral vein at a dosage level of 0.3 γ/Kg of body weight. The blood pressure and the pulse (H.R.) were then recorded on a polygraph through a pressure transducer and a tachometer operated by the R wave of electrocardiograph, respectively, to determine % inhibitory activity of the test compound against the pulse increase and the pressure reduction induced by isoprenaline. The results obtained are shown in Table below.

Table

| Test Compound * | Antagonistic Activity Against ** Isoprenaline (% Inhibitory) | |
|---|---|---|
| | Blood Pressure | Pulse |
| 1 | 92.6 | 82.9 |
| 2 | 100 | 100 |
| 3 | 21.1 | 35.7 |
| 4 | 15.8 | 18.4 |
| 5 | 81.0 | 92.0 |
| 6 | 100 | 100 |

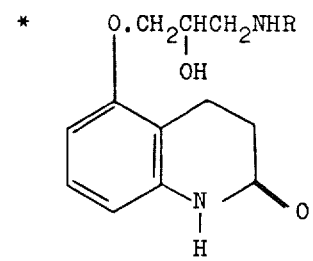

Compound 1 : R=Ethyl
Compound 2 : R=Isopropyl
Compound 3 : R=n-Butyl
Compound 4 : R=Isobutyl
Compound 5 : R=sec-Butyl
Compound 6 : R=tert-Butyl

** The pulse increase and the pressure reduction induced by the administration of isoprenaline alone are referred to as 100%.

While the invention has been described in detail and with reference to specific embodiments thereof, it will be apparent to one skilled in the art that various changes and modifications can be made therein without departing from the spirit and scope thereof.

What is claimed is:

1. A 3,4-Dihydrocarbostyril compound represented by the formula

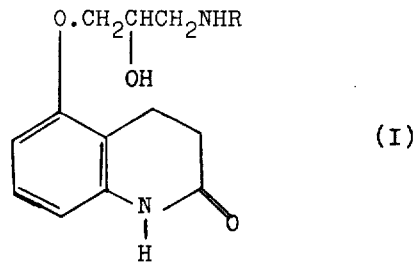

(I)

and the pharmaceutically acceptable acid addition salts thereof, wherein R represents a straight or branched alkyl group having 1 to 4 carbon atoms.

2. 5-(2-Hydroxy-3-methylamino)propoxy-3,4-dihydrocarbostryil according to claim 1.
3. 5-(2-Hydroxy-3-ethylamino)propoxy-3,4-dihydrocarbostyril according to claim 1.
4. 5-(2-Hydroxy-3-propylamino)propoxy-3,4-dihydrocarbostyril according to claim 1.
5. 5-(2-Hydroxy-3-butylamino)propoxy-3,4-dihydrocarbostyril according to claim 1.
6. 5-(2-Hydroxy-3-tert-butylamino)propoxy-3,4-dihydrocarbostyril according to claim 5.

* * * * *

UNITED STATES PATENT AND TRADEMARK OFFICE

CERTIFICATE EXTENDING PATENT TERM
UNDER 35 U.S.C. 156

Patent No.    : 3,910,924

Dated         : October 7, 1975

Inventor(s)   : YASUMITSU TAMURA ET AL

Patent Owner  : OTSUKA PHARMACEUTICAL CO., LTD.

This is to certify that there has been presented to the

COMMISSIONER OF PATENTS AND TRADEMARKS an application under 35 U.S.C. 156 for an extension of the patent term. Since it appears that the requirements of the law have been met, this certificate extends the term of the patent for the period of

2 YEARS with all rights pertaining thereto as provided by 35 USC 156 (b).

I have caused the seal of the Patent and Trademark Office to be affixed this 11th day of December 1989.

Jeffrey M. Samuels
Acting Commissioner of
  Patents and Trademarks